(12) United States Patent
Foerg et al.

(10) Patent No.: US 7,373,945 B2
(45) Date of Patent: May 20, 2008

(54) DEVICE FOR CLOSING A CONDUIT

(75) Inventors: Christian Foerg, Dillishausen (DE); Thomas Monden, Stetten (DE); Udo Woersdoerfer, Landsberg (DE); Mario Paetow, Igling (DE)

(73) Assignee: Hilti Aktiengesellschaft, Schaan (LI)

( * ) Notice: Subject to any disclaimer, the term of this patent is extended or adjusted under 35 U.S.C. 154(b) by 394 days.

(21) Appl. No.: 11/153,842

(22) Filed: Jun. 15, 2005

(65) Prior Publication Data

US 2006/0048815 A1    Mar. 9, 2006

(30) Foreign Application Priority Data

Jun. 17, 2004    (DE) .................. 10 2004 029 276

(51) Int. Cl.
*F16K 17/38* (2006.01)
*F16L 5/04* (2006.01)
*F16L 5/12* (2006.01)
*A62C 2/06* (2006.01)

(52) U.S. Cl. .................... 137/75; 137/79; 52/1; 52/232
(58) Field of Classification Search .................. 137/72, 137/73, 74, 75, 79; 52/1, 232
See application file for complete search history.

(56) References Cited

U.S. PATENT DOCUMENTS

| | | | | | |
|---|---|---|---|---|---|
| 3,462,890 | A | * | 8/1969 | Blumenkranz et al. | 52/1 |
| 3,678,634 | A | * | 7/1972 | Wise et al. | 52/1 |
| 4,109,423 | A | * | 8/1978 | Perrain | 52/1 |
| 4,788,800 | A | * | 12/1988 | Whiteley | 52/1 |
| 5,155,957 | A | * | 10/1992 | Robertson et al. | 52/232 |
| 5,257,641 | A | * | 11/1993 | Elsbury et al. | 137/79 |
| 5,309,688 | A | * | 5/1994 | Robertson | 52/232 |

* cited by examiner

*Primary Examiner*—John Rivell
(74) *Attorney, Agent, or Firm*—Abelman, Frayne & Schwab

(57) ABSTRACT

A device for closing a conduit (30) in case of fire includes a housing (11) having a receptacle (17) for receiving the conduit (30), a cutting and blocking member (20) arranged in the housing (11) and displaceable, in case of fire, by a drive element out of the housing (11) over the receptacle (17) to its blocking position (42) for cutting the conduit (30) off and closing same, with the housing (11) having at least one stop (15) that cooperates with a counter-stop (25) provided on the cutting and blocking member (20) and defines the blocking position (42) thereof the cutting and blocking member (20).

6 Claims, 8 Drawing Sheets

DEVICE FOR CLOSING A CONDUIT

BACKGROUND OF THE INVENTION

1. Field of the Invention

The present invention relates to a device for closing a conduit in case of fire and including a housing having a receptacle for receiving the conduit and attachment sections for receiving fastening elements, a cutting and blocking member arranged in the housing and displaceable, in case of fire, out of the housing through the receptacle to a blocking position for cutting the conduit off and closing same, and a drive element for displacing the cutting and blocking member in case of fire.

2. Description of the Prior Art

Devices of the type described above are used for cutting off and closing of tubular conduits or cable channels, which extend through walls or ceilings, in case of fire. The conduits and channels are formed, in particular, of plastic materials or other materials which yield or soften in case of fire.

U.S. Pat. No. 5,257,641 discloses a fire-stop device having a cutting member displaceable in the device housing and which is driven through a plastic tubular conduit, in case of fire, by drive means. The cutting member is arranged on a slider that closes the tubular conduit. As drive means, e.g., an intumescent material or a spring element is used. The housing is formed of two parts and surrounds the tubular conduit in a mounted condition of the device. To this end, the housing has a circular opening or a receptacle and on which the slide with the cutting member is arranged, sidewise of the receptacle in the initial position of the device. A housing part, which is located opposite the slide, defines a maximal displacement path of the slide.

A drawback of the fire-stop device of U.S. Pat. No. 5,257,641 consists in that it can be arranged only on a conduit that extends through a wall at a distance from a second wall parallel to the conduit or a ceiling. This is because a backward constructional space for the second housing part should be provided.

Accordingly, an object of the present invention is to provide a device for closing conduits or channels in which the foregoing drawback is eliminated, which can be easily mounted, and which provides for a reliable sealing or closing of a tubular conduit, e.g., a plastic tubular conduit which is yieldable in case of fire.

SUMMARY OF THE INVENTION

These and other objects of the present invention, which will become apparent hereinafter, are achieved by providing a device in which the receptacle is open at its side remote from the cutting and blocking member, and the housing has at least one stop that cooperates with at least one counter-stop provided on the cutting and blocking member and which defines the blocking position of the cutting and blocking member.

Such a device can be mounted on a conduit which extends through a wall or a ceiling and directly adjacent to another wall. During mounting, the conduit can be easily displaced in an open receptacle of the device, with the device capable of being displaced over the conduit. Further, a precisely defined closing position insures an exact closing of the conduit because the cutting and blocking member is not displaced too far from the housing and, thus, no faulty function occurs.

Advantageously, the housing is provided with tongue-shaped projections which engage regionwise the circumference of the conduit, which insures a good positioning and centering of the device. The at least one or each stop is advantageously provided on one of the housing projections. Thereby, a most reliable guidance of the cutting and blocking member is achieved.

Advantageously, there are provided two housing projections, with a stop provided on a free end of each of the two housing projections. This insures a very precise limitation of the displacement path of the cutting and blocking member and a precise longitudinal guidance of the cutting and blocking member. This also prevents tilting of the cutting and blocking member in the closing position.

According to a technically advantageous embodiment of the present invention, the cutting and blocking member has two guide sections formed on its respective longitudinal sides, and two counter-stops provided on the ends of respective guide sections which are adjacent to the receptacle. With these measures, the guiding of the cutting and blocking member and limiting the displacement path can be effected only with one element (a dual one, if necessary).

Advantageously, the housing has a bottom which is located adjacent to a wall through which the conduit extends, in a mounted condition of the device, and which has an opening in a region of the receptacle. This opening functions as an access opening through which the intumescent material can penetrate into the interior of the conduit when the cutting and blocking member is displaced to its closing position. The conduit becomes flue gas-proof sealed by the penetrated intumescent material.

Advantageously, the cutting and blocking member has two blocking elements extending parallel to each other and offset relative to each other along a step that extends substantially perpendicular to a drawn-out direction of the cutting and blocking member. The step, on the one hand, can be provided with one or more counter-stops and function as displacement means that can be engaged by the drive means. On the other hand, the step can serve for leading the intumescent mass, which advantageously forms the drive means, into the interior of the conduit in case of fire.

Advantageously, there are provided, on the housing adjacent to the bottom, aeration openings or slots, which provide for a better heat exchange between the housing and a wall or ceiling on which the invention device is mounted.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

A device 10 according to the present invention for closing a conduit 30, such as a plastic pipe or a plastic cable channel, which is shown in FIGS. 1-4, is formed as a fire-stop slide. The device 10 includes a housing 11 and a cutting and blocking member 20 displaceably arranged in the housing 11. The housing 11 is provided on its side, which is located adjacent to a wall 50 in the mounted condition of the device 10, with a bottom 12. The bottom 12 can be formed integrally with the housing 11 or be formed as a separate part. At one end of the housing 11, there is provided a receptacle 17 which is open, parallel to a housing plane 40 that is defined by the housing 11, at two sides. The receptacle 17 is also open at its side extending in the longitudinal direction of the housing 11 and remote from the cutting and blocking member 20. The receptacle 17 is surrounded on its sides regionwise, in a tongue-like manner, by two housing projections 13. The interior space of the housing 11 is provided with an opening 31 which opens toward the receptacle 13 and through which the cutting and blocking member 20 can be displaced from the housing 11 and into the receptacle 17.

Figure 1:
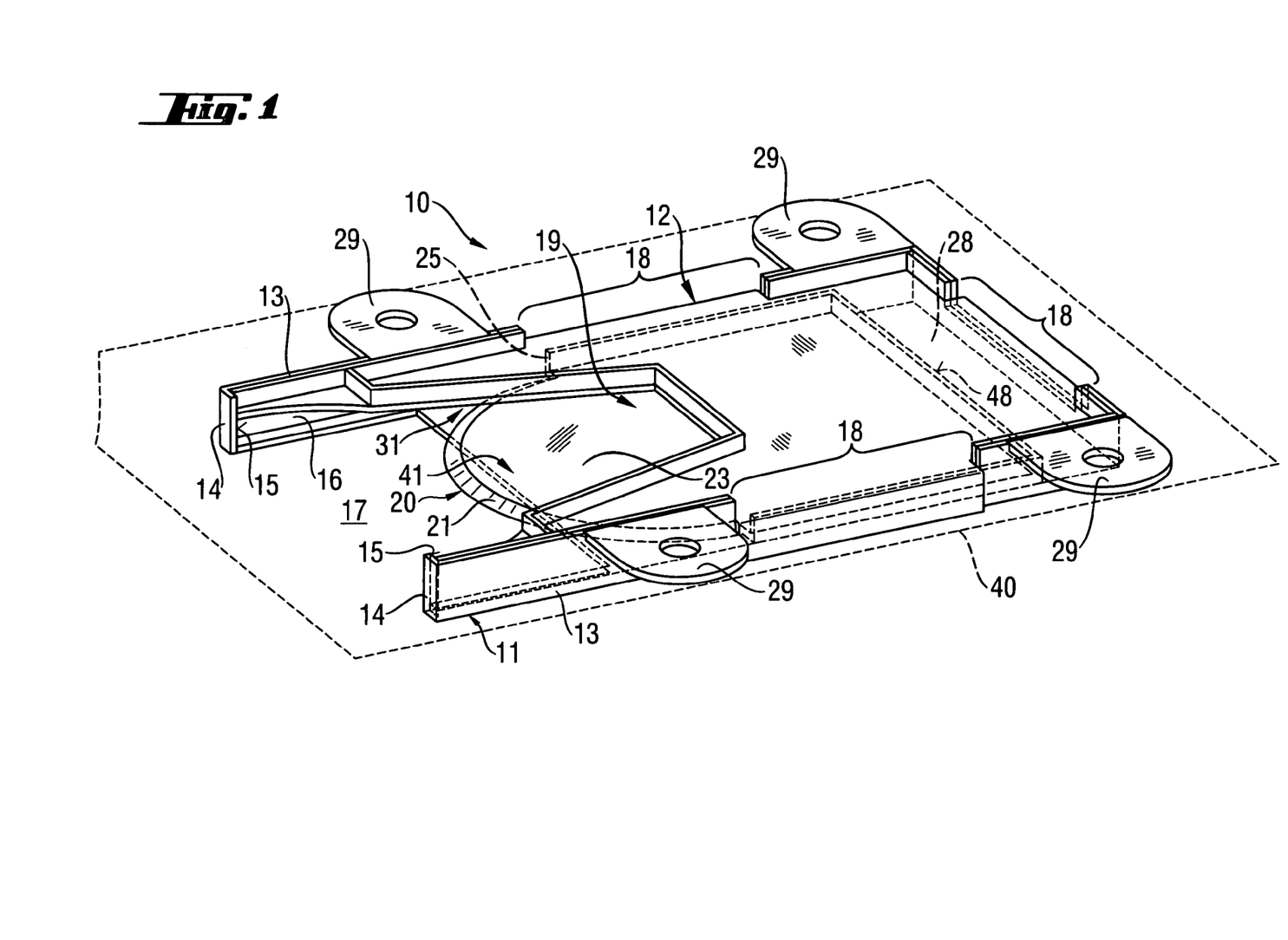
FIG. 1 a perspective view of a first embodiment of a device for closing a conduit according to the present invention in the initial position of the device.
Figure 3:
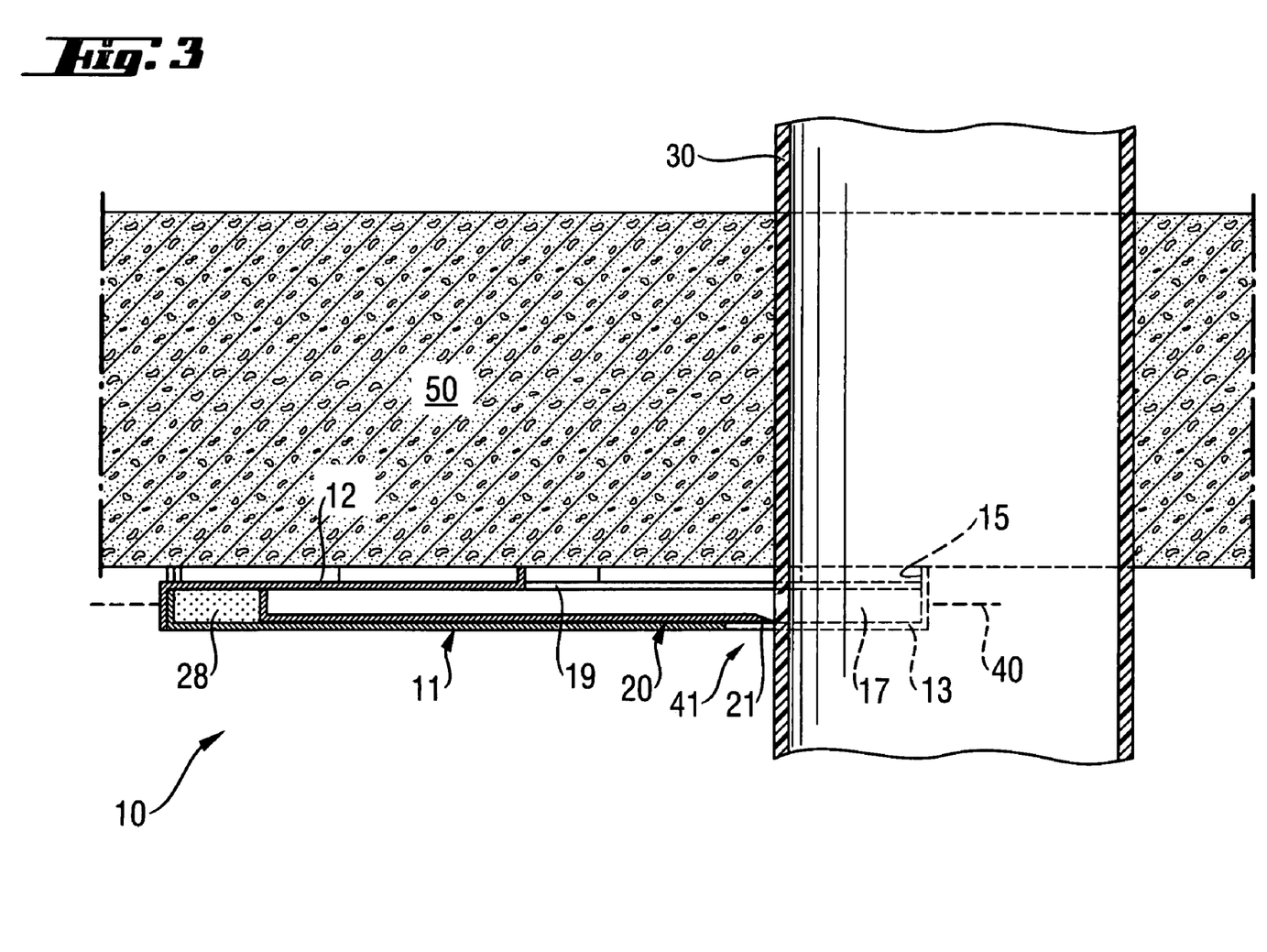
FIG. 3 a longitudinal cross-sectional view of the device shown in FIG. 1 and mounted on a wall adjacent to the conduit in the initial position of the device.

In the initial position 41, which is shown in FIGS. 1 and 3, the cutting and blocking member 20 is located essentially in the housing 11.

Figure 2:
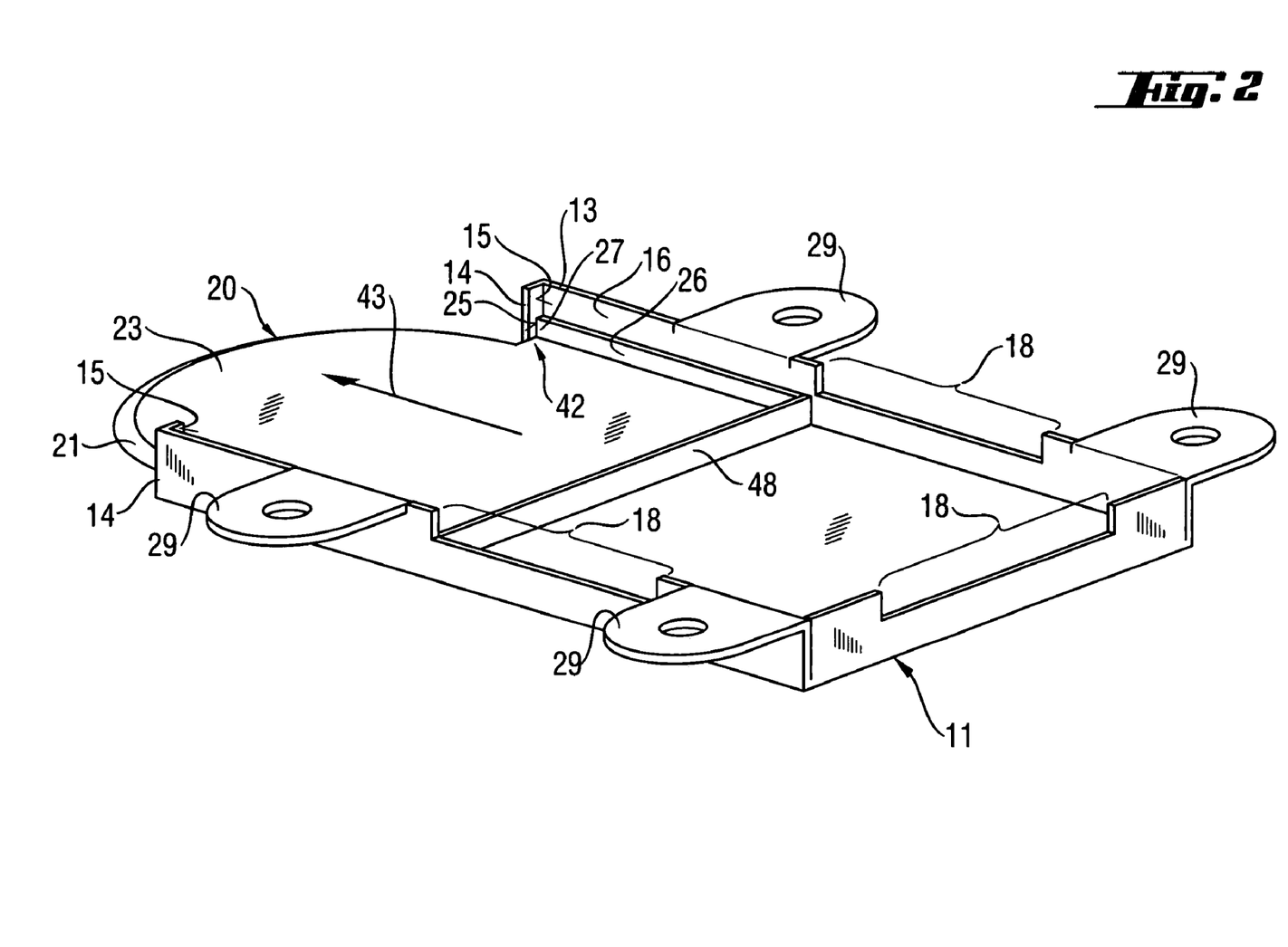
FIG. 2 a perspective view of the conduit closing device shown in FIG. 1, with the bottom of the device housing being removed.

At its end adjacent to the receptacle 17, the cutting and blocking member 20 has a cutting element 21 such as a cutter. On the longitudinal sides of the cutting and blocking member 20, there are provided guide sections 26 that are formed as wall sections that project from a blocking section 23 of the cutting and blocking member 20. The guide sections 26 are displaced in guides 16 of the housing 11.

In the portion of the housing 11 remote from the opening 31, there is provided drive means 28 such as, e.g., an intumescent material or a spring element which expands in response to heat in case of fire. The cutting and blocking member 20 has, at its end adjacent to the drive means 28, displacement means 48 that the drive means 28 can engage. The cutting an blocking member 20 is displaced out of the housing 11 by expanding drive means 28. The displacement means 48 is formed, e.g., as a wall section projecting from the blocking section 23 perpendicular thereto. The projecting wall section extends transverse to the longitudinal extent of the cutting and blocking member 20.

Figure 4:
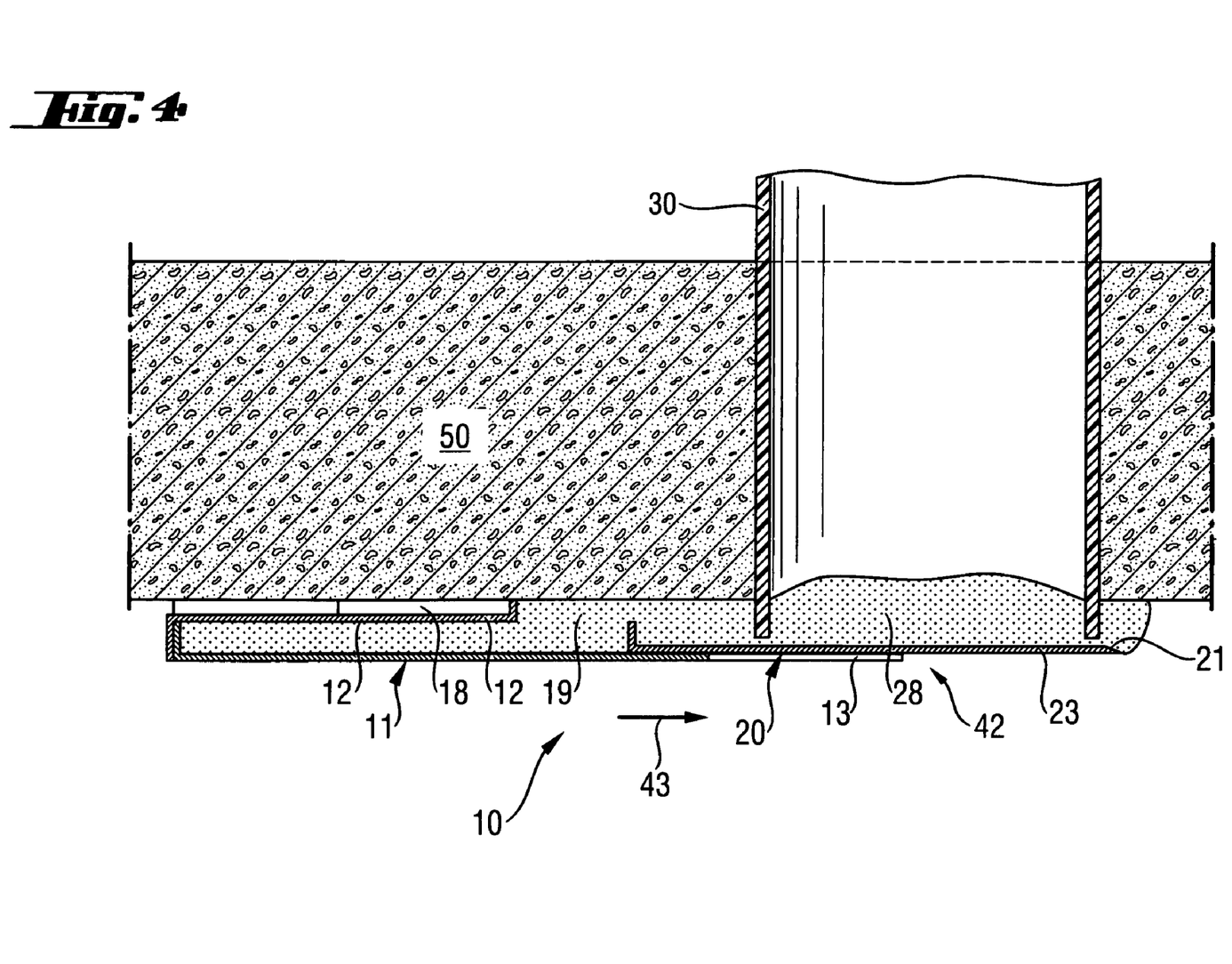
FIG. 4 a longitudinal cross-sectional view similar to that of FIG. 3 in an operational position of the device.

At the free ends 14 of the housing projections 13, there are provided stops 15 that limit the drawing-out path of the cutting and blocking member 20 and define the blocking position 42 shown in FIGS. 2 and 4. The cutting and blocking member 20 is provided with counter-stops 25 which abut, in the blocking position 42, the stops 15 provided on the housing projection 13. The counter-stops 25 are provided, in this embodiment of the inventive device, at the ends 27 of the guide sections 26.

In the blocking position 42, the cutting and blocking member 20 is drawn out of the housing 11 to a maximum, completely blocking or sealing the conduit 30.

Figure 8:
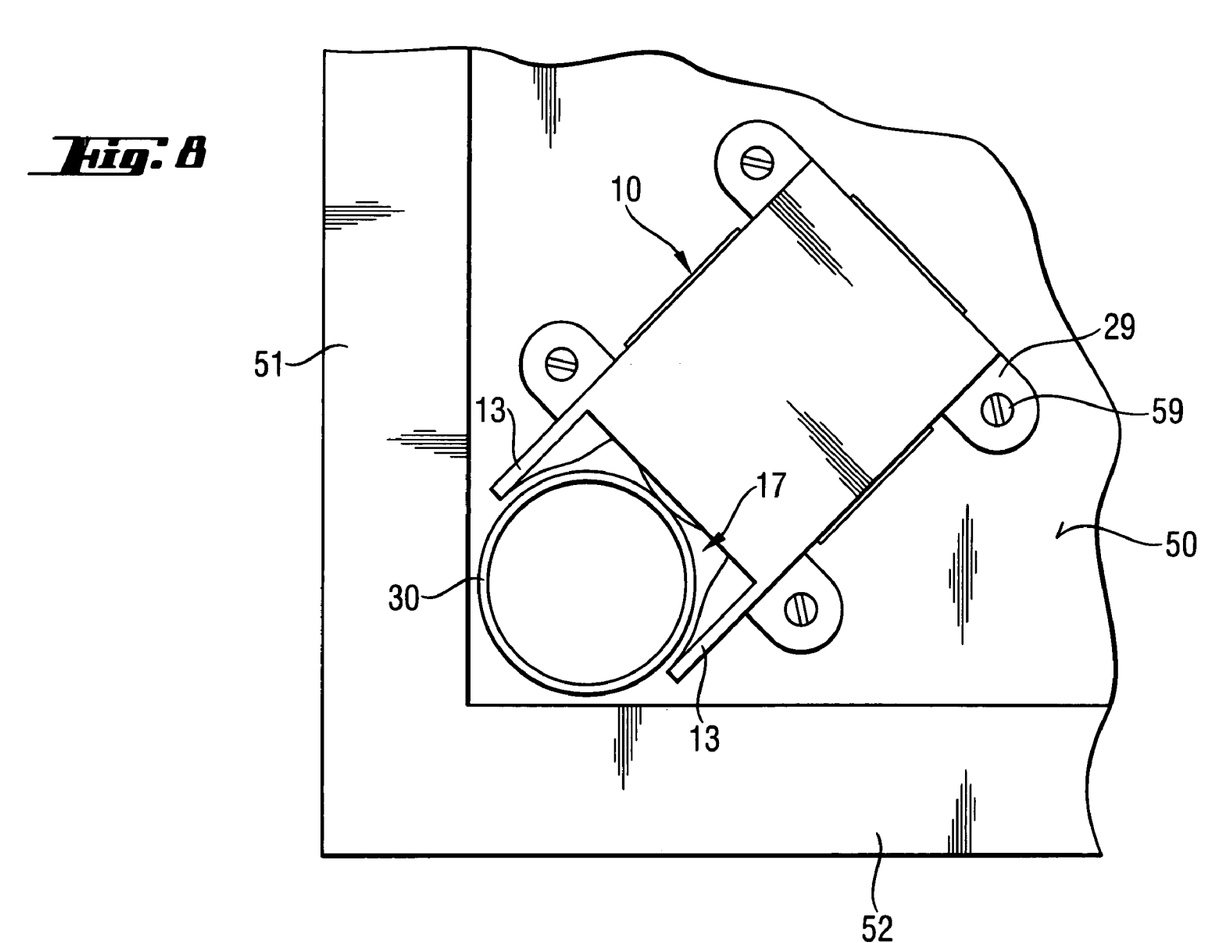
FIG. 8 a partial side view of the device shown in FIG. 1 mounted on a wall in a wall corner region.

In FIGS. 3, 4, and 8, the device 10 is mounted on a wall 50 closely adjacent to a conduit 30 which is formed as a plastic tubular conduit. To this end, the device 10 has attachment section 29 with which the device 10 can be fixedly secured on the wall 50 by fastening elements 59, e.g., screws or nails. The conduit 30 substantially fills in the receptacle 17 and becomes regionwise surrounded by the housing projections 13. Preferably, the housing projections 13 surround maximum a 180° section or about half of the circumferential surface of the conduit 30 which is formed, as mentioned above, as a plastic tubular conduit. As it is particularly shown in FIGS. 3 and 4, the housing bottom 12 is spaced from the wall 50, and aeration openings 18 are provided between the housing bottom 12 and the wall 50. The aeration openings 18 insure, in case of fire, a more rapid heat exchange between the heated air or hot flue gases and the entire device 10. Thereby, in case of fire, the reaction time of the device 10 is reduced.

FIG. 4 shows the device 10 in it operational or actuated condition, with the cutting and blocking member 20 having been displaced in its drawn-out direction 43 to its blocking or sealing position 42 by the drive means 38 formed, as it has already been discussed previously, of an intumescent mass. Initially, the cutting element 21 of the cutting and blocking member 20 cut through the conduit 30 that became soft as a result of action of heat generated by the fire, with the blocking element 23 closing the conduit 30. The expanding intumescent mass flows through an opening 19 in the bottom 12 and past the displacement means 48, expanding into the interior space of the conduit 30. Thereby, a flue gas-proof sealing of the conduit 30 is achieved.

As shown in FIG. 8, the advantage of the device 10 according to the present invention also consists in that it can be used with conduits 30 which are extendable through a wall 50 at corners of a room or other space. In this case, the conduit 30 can extent in a corner directly adjacent a further wall 51 and/or ceiling 52 which prevent(s) a complete surrounding of the conduit 30 with a mounting yoke or the like. The conduit 30 can be extended through the receptacle 17, which is open at three sides, with the device 10 being directly secured on the wall through which the conduit 30 is extendable.

Figure 5:
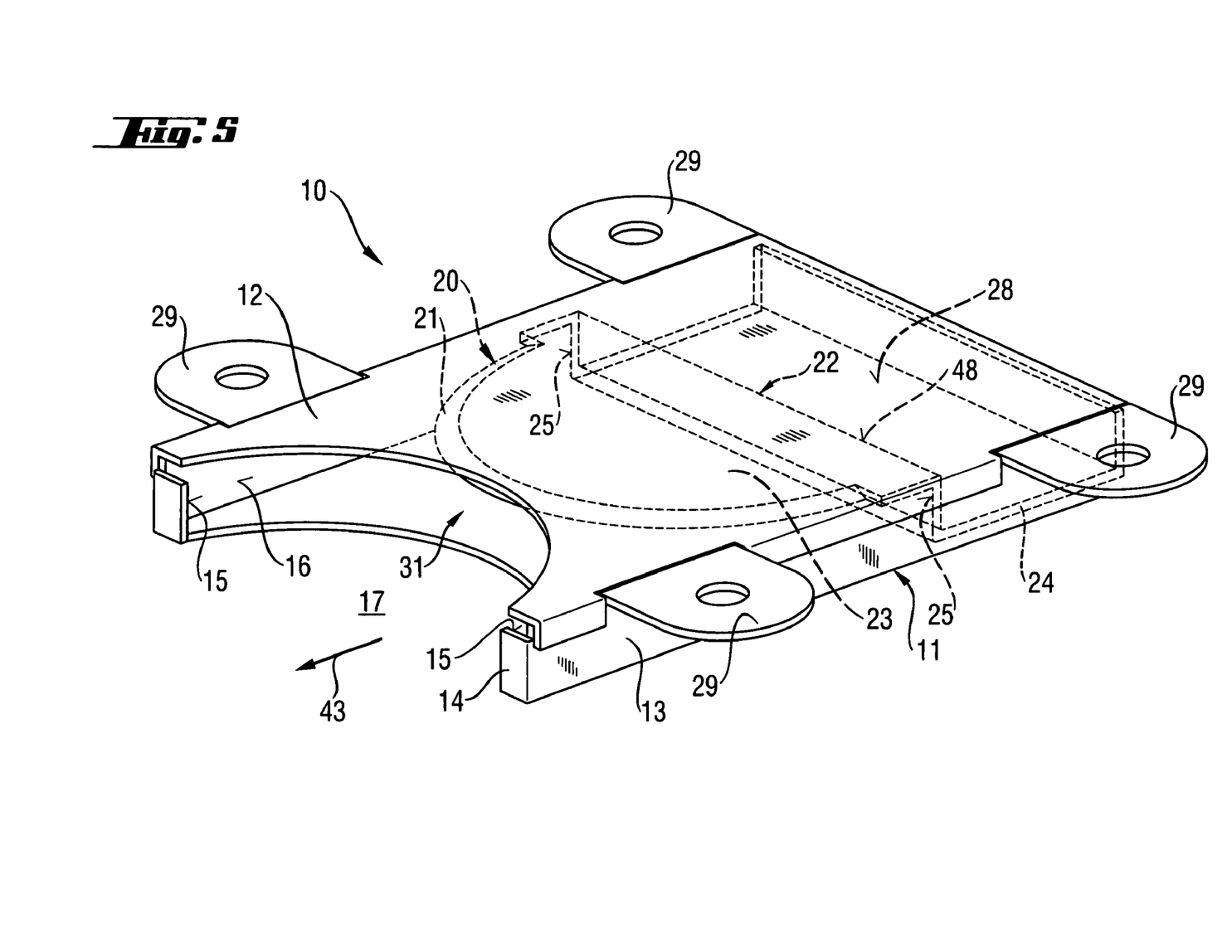
FIG. 5 a perspective view of a second embodiment of a device for closing a conduit according to the present invention in the initial position of the device.
Figure 6:
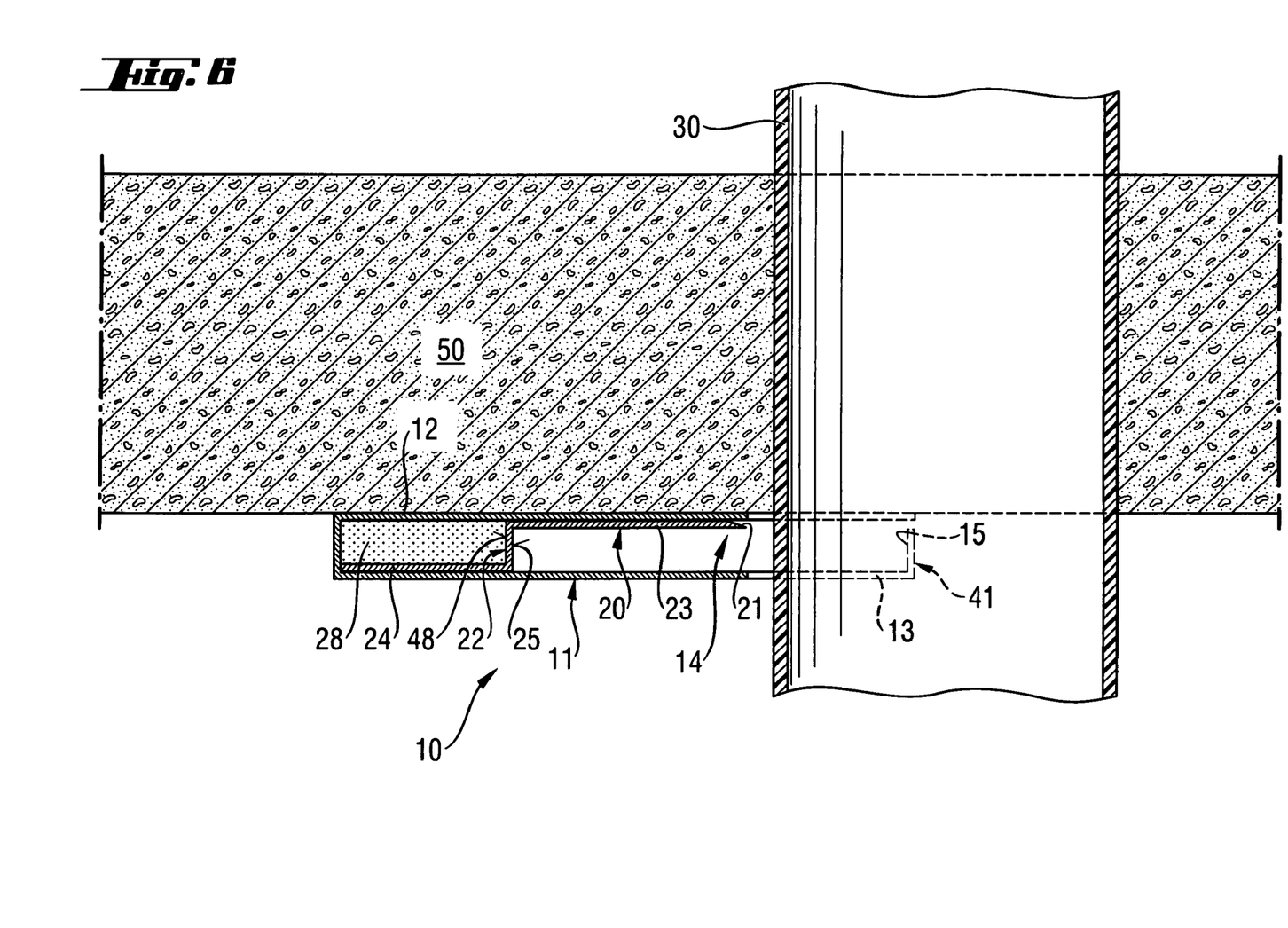
FIG. 6 a longitudinal cross-sectional view of the device shown in FIG. 5 and mounted on a wall adjacent to the conduit in the initial position of the device.
Figure 7:
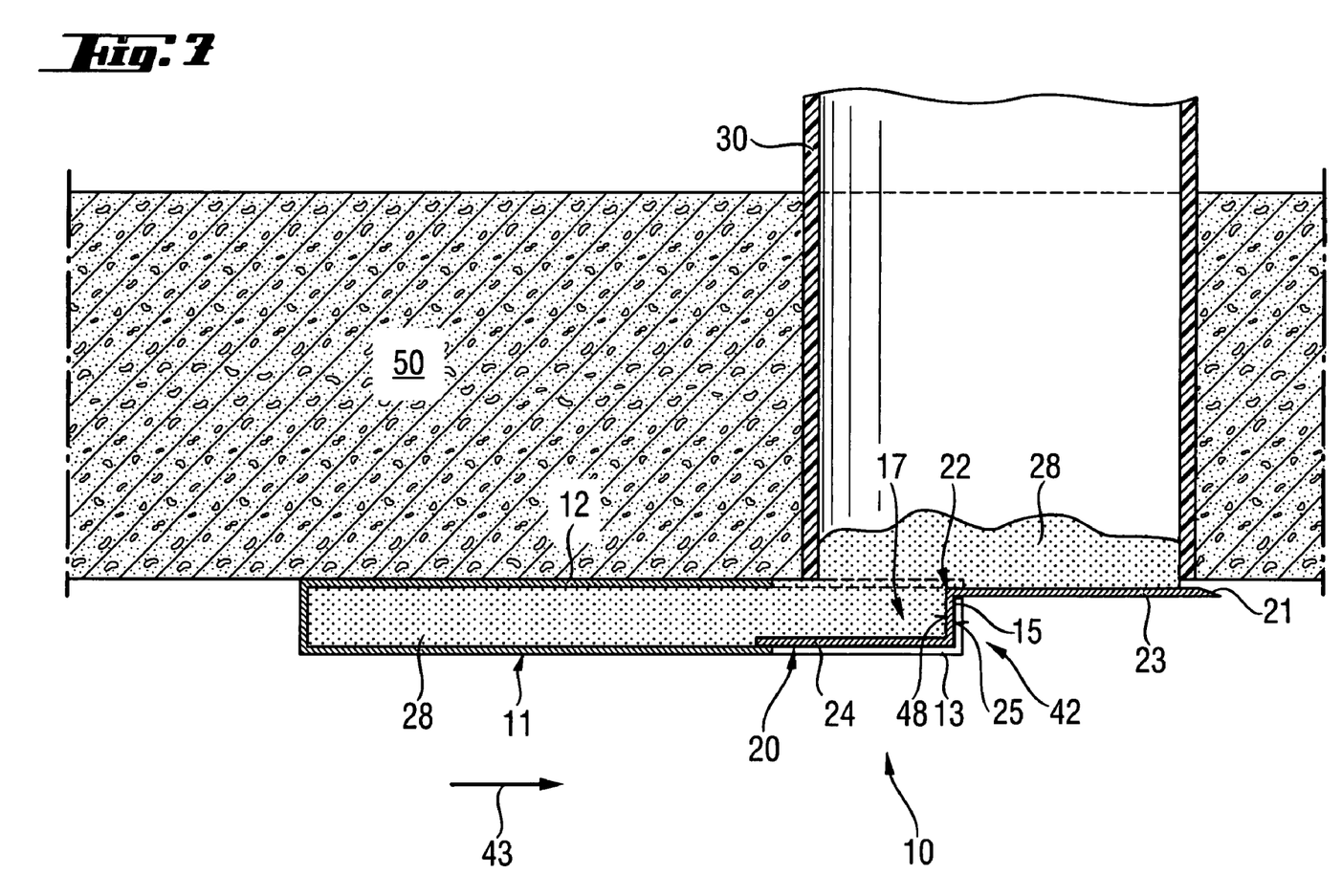
FIG. 7 a longitudinal cross-sectional view similar to that of FIG. 6 in an operational position of the device.

The device 10, which is shown in FIGS. 5-7 differs from the device 10 shown in FIGS. 1-4 in that the cutting and blocking member 20 has two blocking elements or sections 23, 24 which extend parallel to each other and are offset relative to each other by a step 22 that is formed by a wall section extending transverse to the blocking sections 23, 24. At the side ends of the step 22, there are provided counter-stops 25 which can be seen in particular in FIG. 5. The step 22 also forms the displacement means 48 on which the drive means 28 acts. The embodiment of the device 10, which is shown in FIGS. 5-7, does not have an opening in the bottom 10 and aeration openings in side section of the housing 11.

The device 10 is mounted on the wall 50 with fastening elements 29, as it has been described previously.

FIG. 7 shows the second embodiment of the device 10 in a condition after it has been actuated by fire, and the cutting and blocking member 20 has been displaced in its blocking position 42 by the drive means 28 formed of the intumescent mass. In this condition, the counter-stops 25 on the step 22 abut the stops 15 which are provided on the housing projections 13. The cutting and blocking member 20 cut through, with its cutting element 21, the conduit 30 which was soften by the heat produced by fire, closing the conduit 30 with the blocking elements 23, 24. The intumescent mass expands into the interior space of the conduit 30 through the receptacle 17 along the blocking element 23, whereby a flue gas proof sealing of the conduit 30 is achieved.

Though the present invention was shown and described with references to the preferred embodiments, such are merely illustrative of the present invention and are not to be construed as a limitation thereof, and various modifications of the present invention will be apparent to those skilled in the art. It is therefore, not intended that the present invention be limited to the disclosed embodiments or details thereof, and the present invention includes all variations and/or alternative embodiments within the spirit and scope of the present invention as defined by the appended claims.

What is claimed is:

1. A device for closing a conduit (30) in case of fire, comprising a housing (11) having a receptacle (17) for receiving the conduit (30) and attachment means (29) for receiving fastening means; a cutting and blocking member (20) arranged in the housing (11) and displaceable, in case of fire, over the receptacle (17) to a blocking position (42) thereof for cutting the conduit (30) off and closing same, the receptacle (12) being open at a side thereof remote from the cutting and blocking member (20), and the housing (11) having at least one stop (15) that cooperates with at least one counter-stop (25) provided on the cutting and blocking member (20) and defines the blocking position (42) thereof; and drive means (28) for displacing the cutting and blocking member (20) in case of fire, wherein the housing (11) has a plurality of housing projections (13) bordering the receptacle (17), and the at least one stop (15) is provided on one of the projections (13).

2. A device according to claim 1, wherein the cutting and blocking member (20) has two guide sections (26) formed on respective longitudinal sides thereof, and two counter-stops (25) provided on ends (27) of respective guide sections (26) adjacent to the receptacle (17).

3. A device for closing a conduit (30) in case of fire, comprising a housing (11) having a receptacle (17) for receiving the conduit (30) and attachment means (29) for receiving fastening means; a cutting and blocking member (20) arranged in the housing (11) and displaceable, in case of fire, over the receptacle (17) to a blocking position (42) thereof for cutting the conduit (30) off and closing same, the receptacle (12) being open at a side thereof remote from the cutting and blocking member (20), and the housing (11) having at least one stop (15) that cooperates with at least one counter-stop (25) provided on the cutting and blocking member (20) and defines the blocking position (42) thereof; and drive means (28) for displacing the cutting and blocking member (20) in case of fire, wherein the housing (11) has two housing projections (13) bordering the receptacle (17), and two stops (15) provided on free ends (14) of the respective housing projections (13), respectively.

4. A device for closing a conduit (30) in case of fire, comprising a housing (11) having a receptacle (17) for receiving the conduit (30) and attachment means (29) for receiving fastening means; a cutting and blocking member (20) arranged in the housing (11) and displaceable, in case of fire, over the receptacle (17) to a blocking position (42) thereof for cutting the conduit (30) off and closing same, the receptacle (12) being open at a side thereof remote from the cutting and blocking member (20), and the housing (11) having at least one stop (15) that cooperates with at least one counter-stop (25) provided on the cutting and blocking member (20) and defines the blocking position (42) thereof; and drive means (28) for displacing the cutting and blocking member (20) in case of fire, wherein the cutting and blocking member (20) has two blocking elements (23, 24) extending parallel to each other and offset relative to each other along a step (22) that extends substantially perpendicular to a drawn-out direction (43) of the cutting and blocking member (20).

5. A device according to claim 4, wherein the at least one counter-stop (25) of the cuffing and blocking member (20) is provided on the step (22).

6. A device for closing a conduit (30) in case of fire, comprising a housing (11) having a receptacle (17) for receiving the conduit (30) and attachment means (29) for receiving fastening means; a cutting and blocking member (20) arranged in the housing (11) and displaceable, in case of fire, over the receptacle (17) to a blocking position (42) thereof for cuffing the conduit (30) off and closing same, the receptacle (12) being open at a side thereof remote from the cutting and blocking member (20), and the housing (11) having at least one stop (15) that cooperates with at least one counter-stop (25) provided on the cutting and blocking member (20) and defines the blocking position (42) thereof; and drive means (28) for displacing the cutting and blocking member (20) in case of fire, wherein the housing (11) has aeration openings (18) provided adjacent to a bottom (12) thereof.

* * * * *